(12) United States Patent
Schneider

(10) Patent No.: US 10,207,743 B2
(45) Date of Patent: Feb. 19, 2019

(54) AUTOMOTIVE VEHICLE STRUCTURAL PART AND METHOD OF PRODUCING THE SAME

(71) Applicant: ArcelorMittal, Luxembourg (LU)

(72) Inventor: Nicolas Schneider, Saint-Martin-Longueau (FR)

(73) Assignee: ArcelorMittal, Luxembourg (LU)

( * ) Notice: Subject to any disclaimer, the term of this patent is extended or adjusted under 35 U.S.C. 154(b) by 19 days.

(21) Appl. No.: 15/511,939

(22) PCT Filed: Sep. 22, 2015

(86) PCT No.: PCT/IB2015/057286
§ 371 (c)(1),
(2) Date: Mar. 16, 2017

(87) PCT Pub. No.: WO2016/046739
PCT Pub. Date: Mar. 31, 2016

(65) Prior Publication Data
US 2017/0291646 A1    Oct. 12, 2017

(30) Foreign Application Priority Data

Sep. 22, 2014 (WO) .................. PCT/IB2014/064736

(51) Int. Cl.
| | |
|---|---|
| *B62D 29/00* | (2006.01) |
| *B62D 25/16* | (2006.01) |
| *B62D 25/20* | (2006.01) |
| *B62D 33/023* | (2006.01) |
| *B23K 26/244* | (2014.01) |
| *B21D 22/02* | (2006.01) |
| *B23K 101/00* | (2006.01) |
| *B23K 26/21* | (2014.01) |

(52) U.S. Cl.
CPC .......... *B62D 25/16* (2013.01); *B21D 22/022* (2013.01); *B23K 26/244* (2015.10); *B62D 25/2036* (2013.01); *B62D 25/2054* (2013.01); *B62D 33/023* (2013.01); *B23K 26/21* (2015.10); *B23K 2101/006* (2018.08)

(58) Field of Classification Search
CPC . B62D 29/007; B62D 29/008; B23K 2203/04
See application file for complete search history.

(56) References Cited

U.S. PATENT DOCUMENTS

| | | | |
|---|---|---|---|
| 4,354,708 A | * 10/1982 | Koto ................. | B62D 25/2054 280/847 |
| 8,221,899 B2 | * 7/2012 | Takeda .................. | B23K 9/007 219/91.2 |
| 8,651,562 B2 | 2/2014 | Zoernack | |

(Continued)

FOREIGN PATENT DOCUMENTS

| | | |
|---|---|---|
| CN | 101193789 A | 6/2008 |
| CN | 101502920 B | 12/2010 |
| CN | 103052541 A | 4/2013 |

*Primary Examiner* — Bryan A Evans
(74) *Attorney, Agent, or Firm* — Davidson, Davidson & Kappel, LLC

(57) ABSTRACT

The automotive vehicle structural part (30) includes at least a main panel (40) and a wheel casing (42), the main panel (40) and the wheel casing (42) being made of two distinct three-dimensional parts made of different materials attached to each other by welding.

17 Claims, 2 Drawing Sheets

(56) References Cited

U.S. PATENT DOCUMENTS

| | | | |
|---|---|---|---|
| 2007/0029290 A1* | 2/2007 | Kehrer | B23K 26/28 |
| | | | 219/121.14 |
| 2010/0078970 A1* | 4/2010 | Kim | B62D 25/16 |
| | | | 296/198 |
| 2013/0140851 A1* | 6/2013 | Zornack | B62D 21/157 |
| | | | 296/193.06 |

* cited by examiner

AUTOMOTIVE VEHICLE STRUCTURAL PART AND METHOD OF PRODUCING THE SAME

The present invention concerns an automotive vehicle structural part.

In particular, the invention relates to an automotive vehicle structural part forming the bed side inner panel of a pick-up automotive vehicle.

BACKGROUND

Pickup trucks generally comprise a frame assembly having a front end supporting a cab for carrying passengers and a rear end supporting a cargo box, also called bed, for carrying cargo.

A cargo box for a pickup truck typically includes a base panel bounded by upstanding walls to form a container. The walls include two side walls, a front wall and a rear wall. The rear wall may be pivotably mounted to provide a tailgate facilitating the insertion or removal of articles in the cargo box. Each side wall includes a wheel casing which protrudes into the cargo box and which is destined to be placed above a rear wheel of the vehicle.

The walls of the cargo box are each generally made of an inner panel being a structural part and an outer panel being an ornament panel.

The inner panels are each generally made of a metallic material, for example steel. For example, it is known to produce the cargo box by providing a steel blank for each inner panel and by stamping the blanks so as to shape the panels. In particular, each side panel is produced from a one-piece blank, i.e. a blank obtained by cutting a single steel sheet.

SUMMARY OF THE INVENTION

When designing such a cargo box, several requirements, often conflicting with each other, must be complied with. Indeed, it is desirable to design the cargo box so that it may resist to heavy loads, in particular resist the impacts of the loads during their insertion into the cargo box, without permanently deforming or breaking. Furthermore, it is desirable to reduce the overall weight of the vehicle, in order to reduce the energy consumption of the vehicle, so as to meet the future environment requirements. It is thus desirable to reduce the thicknesses of the parts forming the vehicle, in particular the panels of the cargo box. However, simply reducing the thicknesses of the panels leads to a degraded resistance to deformation.

An object of the invention is to solve the above-mentioned problems, and in particular to provide an automotive vehicle structural part having a reduced weight and an improved resistance to impacts.

To that end, the invention relates to an automotive vehicle structural part comprising at least a main panel and a wheel casing, said main panel and said wheel casing being made of two distinct three-dimensional parts made of different materials attached to each other by welding.

Forming the main panel and the wheel casing of the structural part as two distinct parts made of different materials allows choosing for each of the main panel and the wheel casing a material and a thickness offering an optimal performance, in function of the stress which they may be submitted to, so that both the resistance of the structural part and its weight may be optimized.

According to other advantageous aspects of the invention, the automotive vehicle structural part comprises one or more of the following features, considered alone or according to any technically possible combination:

the material of the wheel casing has a higher mechanical resistance than the material of the main panel;

the deformation rate, i.e. the deformation quantity, of the main panel is equal to the deformation rate, i.e. the deformation quantity, of the wheel casing on either side of the welding line attaching the main panel and the wheel casing;

the automotive vehicle structural part further comprises at least one lateral panel, extending at one end of the main panel, said lateral panel and said main panel being made of distinct parts made of different materials attached to each other by welding;

said lateral panel and said main panel are made of distinct parts attached to each other by welding before said parts are stamped;

said lateral panel and said main panel are produced from a laser welded blank;

the material of the lateral panel is the same as the material of the wheel casing;

the automotive vehicle structural part comprises two lateral panels, distinct from the main panel, the lateral panels extending on either side of the main panel and being attached to said main panel by welding;

said lateral panels are welded to said main panel before stamping;

said lateral panels and said main panel are produced from a laser welded blank;—the main panel is made of high strength low alloy steel;

the wheel casing is made of dual-phase steel;

the lateral panel(s) are made of dual-phase steel;

the automotive structural part forms the bed side inner panel of a cargo box of a pick-up automotive vehicle;

the main panel comprises a lower portion and an upper portion protruding substantially perpendicularly from the lower portion.

The invention also relates to a cargo box of a pick-up automotive vehicle comprising at least a bed side inner panel, said bed side inner panel being an automotive structural part according to the invention.

The invention also relates to a method for producing an automotive vehicle structural part according to the invention, comprising the following steps:

stamping a blank of a first material for shaping the main panel, stamping a blank of a second material, different from the first material, for shaping the wheel casing, attaching the main panel to the wheel casing by welding.

According to other advantageous aspects of the invention, the method comprises one or more of the following features, considered alone or according to any technically possible combination:

the main panel is attached to the wheel casing by laser welding;

the laser welding is carried out by butt welding, using a filler material, or by lap welding;

the method further comprises the following steps prior to stamping the blank of the first material:

attaching a blank of a third material to one of the lateral side of the blank of the first material by laser welding to obtain a side panel blank, stamping the side panel blank in a single operation to shape together the main panel and the lateral panel;

the third material is the same as the second material.

BRIEF DESCRIPTION OF THE DRAWINGS

Other features and advantages of the invention will be better understood from a reading of the following description, given with reference to the appended drawings, in which.

DETAILED DESCRIPTION

In the following description, the terms inner, outer, front, rear, transversal, longitudinal, vertical and horizontal are construed with reference to the usual orientation of the illustrated elements, parts or structures when assembled on a vehicle structure.

Figure 1:
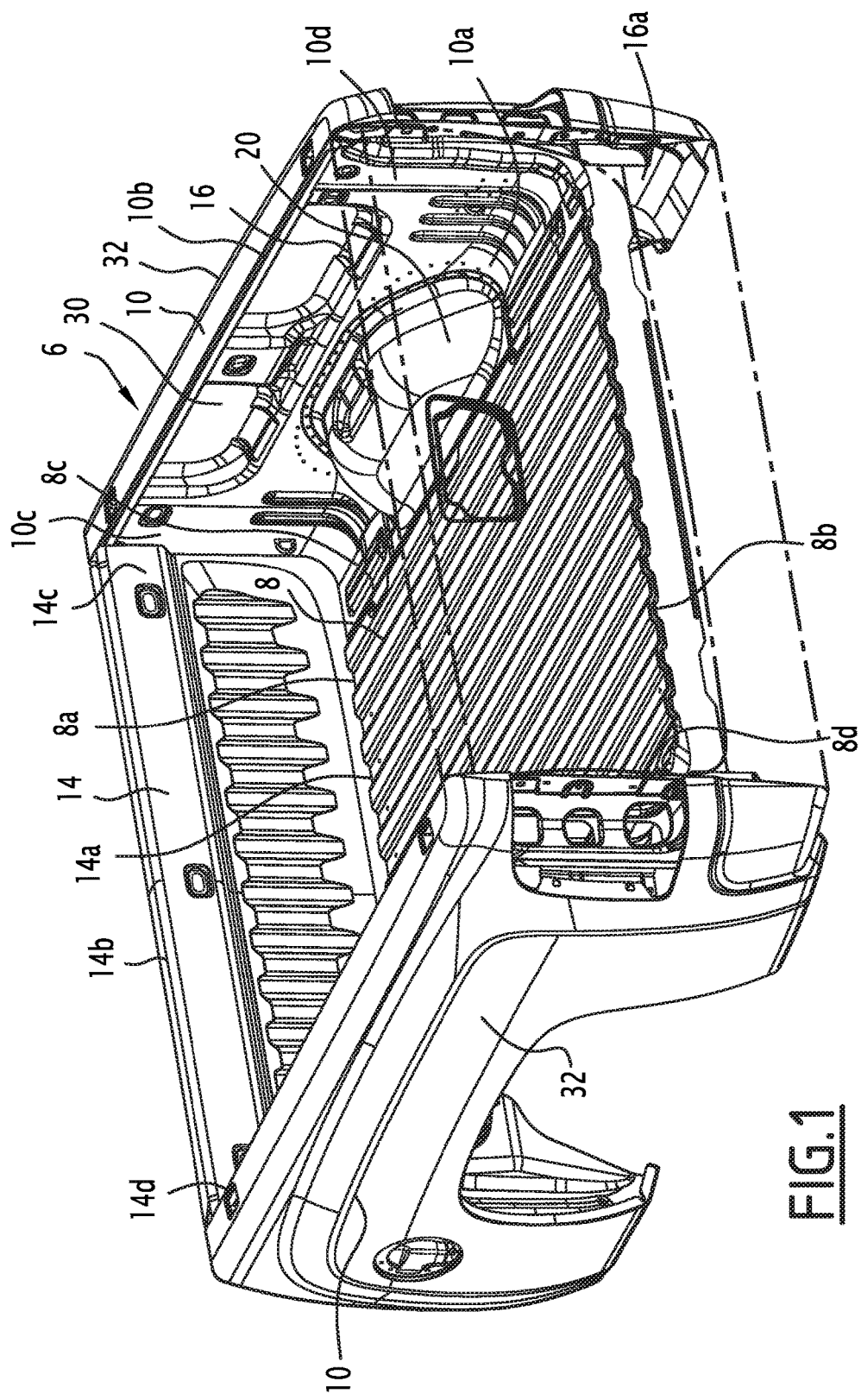
FIG. 1 is a perspective view of a cargo box of a pickup truck comprising an automotive vehicle structural part according to a particular embodiment.

A cargo box 6 of a pickup truck is illustrated on FIG. 1. A pickup truck generally comprises a cab portion for carrying passengers and a cargo box 6, also called bed, for carrying various types of cargo loads. The cab portion and the cargo box 6 are mounted on a front and a rear end respectively of the frame of the pickup truck.

The cargo box 6 comprises a base 8 and four side walls including right and left side walls 10, a front wall 14, and a rear wall 16 which is forming a tailgate.

The base 8 has a substantially rectangular shape.

The base 8 is substantially horizontal, and extends longitudinally between a front edge 8a and a rear edge 8b, and transversally between a right side edge 8c and a left side edge 8d.

The front wall 14 extends in a transversal plane. In particular, the front wall 14 extends vertically between a lower edge 14a and an upper edge 14b, and transversally between a right side edge 14c and a left side edge 14d.

The front wall 14 projects upwardly from the front edge 8a of the base 8.

The front wall 14 has a width, taken along a transversal direction, at least equal to that of the base 8.

Each side wall 10 substantially extends in a vertical longitudinal plane. In particular, each side wall 10 extends vertically between a lower edge 10a and an upper edge 10b, and longitudinally between a front edge 10c and a rear edge 10d.

Each side wall 10 thus protrudes upwardly from a side edge 8c, 8d of the base 8.

Each side wall 10 has a length, taken along a longitudinal direction, at least equal to that of the base 8.

Furthermore, each side wall 10 comprises a wheel well 20 extending upwardly and protruding into the cargo box 6. Each wheel well 20 forms, under the cargo box 6, a recess adapted to receive an upper part of a rear wheel of the pickup truck 2.

The upper edges 14b, 10b of the front 14 and side 10 walls are substantially level.

The tailgate 16 is pivotally mounted at a lower tailgate edge adjacent to the rear edge 8b of the base 8. The tailgate 16 may thus pivot between a closed position and an open position. In the closed position, the tailgate 16 extends upwardly and substantially vertically from the rear edge 8b of the base 8.

Each of the right and left side walls 10 comprises an inner panel 30, hereinafter called bed side inner panel 30, and an outer panel 32.

The bed side inner panel 30 is a structural part of the pickup truck 2.

The bed side inner panel 30 comprises an inner face oriented towards the inside of the cargo box 6, and an outer face destined to face an inner face of the outer panel 32.

The outer panel 32 is an ornament panel. The outer panel 32 comprises an inner face destined to cover the outer face of the bed side inner panel 30 and an outer face oriented towards the outside of the pickup truck 2.

Figure 2:
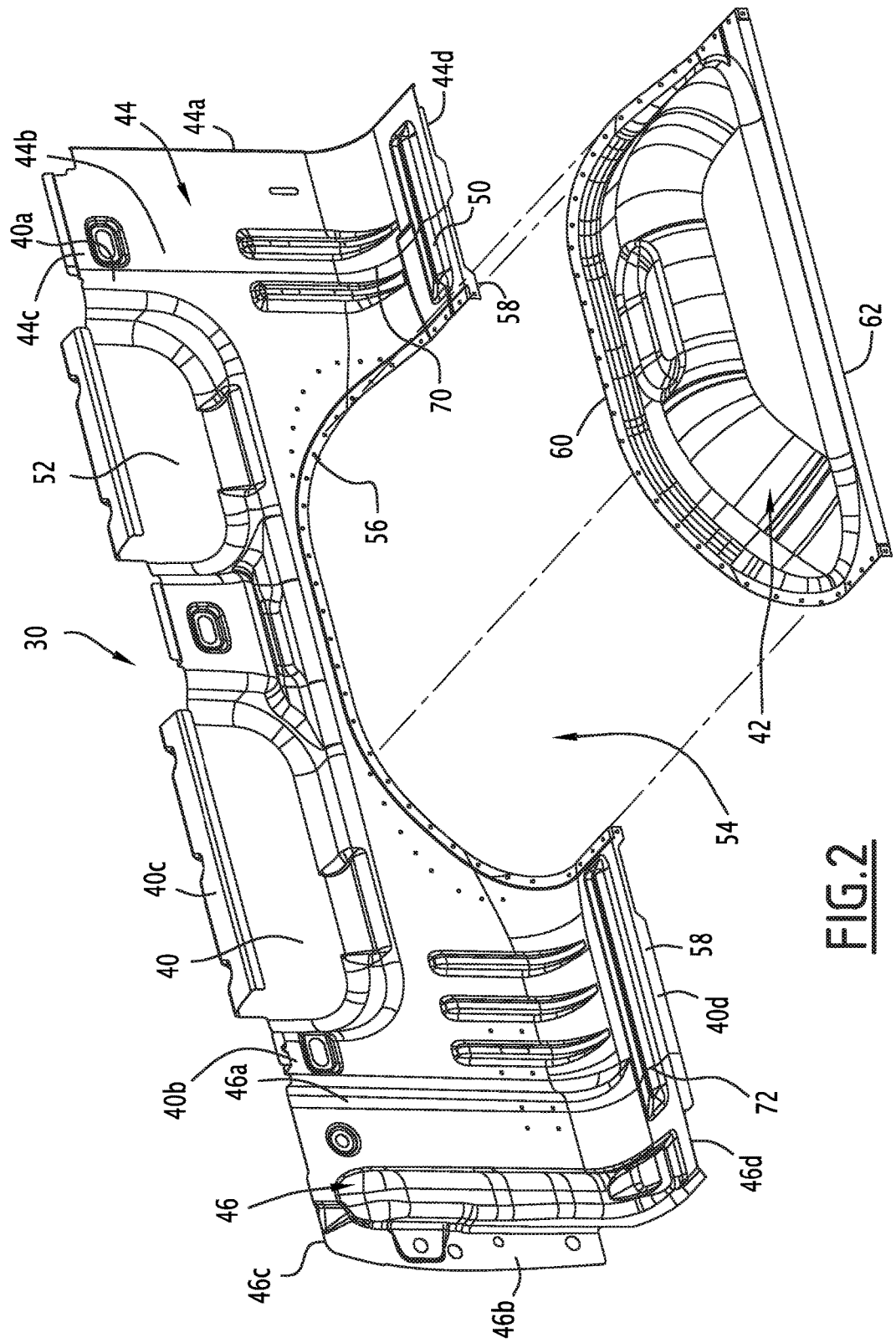
FIG. 2 shows a partially exploded perspective view of the automotive vehicle structural part of FIG. 1.

As illustrated on FIG. 2, the bed side inner panel 30 includes a main panel 40 and a wheel casing 42. The bed side inner panel 30 further includes two lateral panels 44, 46.

The main panel 40 extends longitudinally between a front end 40a and a rear end 40b, and vertically between an upper end 40c and a lower end 40d.

The main panel 40 is a three-dimensional part, which is not planar. In particular, the main panel 40 comprises a lower portion and an upper portion protruding substantially perpendicularly from the lower portion.

For example, the main panel 40 comprises a lower portion 50 which is substantially horizontal and destined to be attached to a side edge 8c, 8d of the base 8 so as to extend in the continuation of the base 8, and an upper portion 52 protruding substantially vertically from the horizontal portion 50 to the upper edge 40c.

The main panel 40 comprises an opening 54 located between the front and rear ends 40a, 40b, for example substantially half-way between the front and rear ends 40a, 40b, and extending from the horizontal portion 50 up to the vertical portion 52. The opening 54 is destined to allow the passage of an upper part of a rear wheel of the pickup truck 2. For example, the opening 54 has a substantially ovoid shape.

The opening 54 thus defines a three-dimensional edge 56 of the main panel 40, which is for example curved.

The horizontal portion 50 comprises two lateral edges 58 extending on either sides of the opening 54, and contiguous to either ends of the curved edge 56. The lateral edges 58 are destined to be joined to the side edge 8c, 8d of the base 8. The lateral edges 58 are for example straight edges.

The lower end 40d of the main panel 40 is thus formed by the lateral edges 58 and the three-dimensional edge 56.

The wheel casing 42, which forms the wheel well 20, is a three-dimensional part forming an upwardly extending protrusion, so as to form under the cargo box a recess adapted to fit an upper part of a rear wheel of the pickup truck 2.

The wheel casing 42 comprises a three-dimensional curved edge 60 having a shape complementary to that of three-dimensional curved edge 56 of the main panel 40, and a generally straight lower edge 62 joining the ends of the curved edge 60. The wheel casing 42 is destined to be fitted into the opening 54 of the main panel 40, the curved edge 60 of the wheel casing being contiguous to the curved edge 56 of the main panel 40.

When the wheel casing 42 and the main panel 40 are thus assembled, the straight lower edge 62 of the wheel casing 42 is level with the lower edges 58 of the main panel 40. The straight lower edge 62 is destined to be joined to the side edge 8c, 8d of the base 8.

The main panel 40 and the wheel casing 42 are made of two distinct three-dimensional parts made of different materials, for example different steels.

Thus, the main panel 40 is made of a first material, and the wheel casing 42 is made of a second material, different from the first material.

The first material is steel, for example a high strength low-alloy steel (so called HSLA). For example, the steel has a yield strength comprised between 300 and 360 MPa and a tensile strength comprised between 390 and 450 MPa.

The first material may be uncoated or coated, for example galvannealed or galvanized by any suitable process such as hot dip coating, electrodeposition, vacuum coating.

The main panel 40 has a thickness preferably comprised between 0.5 mm and 1.2 mm, for example 0.7 mm.

Preferably, the second material has a higher mechanical resistance than the first material. Indeed, when the base 8 is subjected to impact, stress received by the base 8 is transferred to the wheel casing 42, which should be able to absorb the energy of the impact without permanently deforming or bending.

Thus, the second material preferably has a higher mechanical resistance than the material of the main panel 40.

For example, the second material has a tensile strength higher than the first material, and preferably a yield strength higher than the first material. For example, the difference between the tensile strength of the second material and the tensile strength of the first material is of at least 140 MPa, preferably of at least 200 MPa.

Furthermore, the difference between the yield strength of the second material and the yield strength of the first material is of at least 50 MPa.

For example, the second material is a dual-phase steel, having a yield strength to tensile strength ratio for example inferior to 0.6, preferably inferior to 0.5.

Preferably, the dual-phase steel has a tensile strength greater than or equal to 590 MPa.

The second material may be uncoated or coated, for example galvannealed or galvanized by any suitable process such as hot dip coating, electrodeposition, vacuum coating.

The wheel casing 42 has a thickness preferably greater than the main panel 40, for example 0.85 mm.

The use of a dual-phase steel for the wheel casing 42, having relatively high tensile strength for a given yield strength, as compared to a conventional high strength low-alloy steel, provides in the same time a good energy absorption ability and a good fatigue strength, and a good formability. In other words, for a given tensile strength required to ensure good energy absorption properties during an impact, the yield strength is lower than that of conventional high strength low-alloy steel, so that the wheel casing 42 may be formed by cold stamping without obtaining necking or thickening of the steel.

Thus, forming the main panel 40 and the wheel casing 42 as two separate parts allows choosing for each of these parts a material and a thickness offering an optimal performance, in function of the stress which they may be submitted to and the formability required to shape the parts.

Therefore, both the resistance of the bed side inner panel 30 and its weight can be optimized.

The main panel 40 and the wheel casing 42 are attached to each other by welding, along a continuous welding line joining the edges 56 and 60.

The lateral panels include a front 44 and a rear 46 lateral panels. The front and rear lateral panels 44, 46 extend respectively at the front and rear ends 40a, 40b of the main panel 40.

Each lateral panel 44, 46 extends longitudinally between a front end 44a, 46a and a rear end 44b, 46b and vertically between an upper end 44c, 46c and a lower end 44d, 46d.

The lateral panels 44, 46 are attached to the main panel 40 by welding, the rear end 44b of the front lateral panel 44 being contiguous to the front end 40a of the main panel 40, and the front end 46a of the rear lateral panel 46 being contiguous to the rear end 40b of the main panel 40.

Furthermore, the upper ends 44c, 46c are substantially level with the upper end 40c, and the lower ends 44d, 46d are substantially level with the lower end 40d.

The front lateral panel 44 is destined to be joined to the front wall 14, by assembling the front end 44a of the front lateral panel 44 to a side edge 14c or 14d of the front wall 14, for example by welding.

The lateral panels 44, 46 and the main panel 40 are preferably made of distinct parts, at least one of the lateral panels 44, 46 being made of a third material different from the first material of the main panel 40. Preferably, both laterals panels 44, 46 are made of a material different from the first material of the main panel 40. For example, both lateral panels 44, 46 are made of the third material.

Preferably, the third material has a higher mechanical resistance than the material of the main panel 40.

For example, the third material has a tensile strength higher than the first material, and preferably a yield strength higher than the first material. For example, the difference between the tensile strength of the third material and the tensile strength of the first material is of at least 140 MPa, preferably of at least 200 MPa.

Furthermore, the difference between the yield strength of the third material and the yield strength of the first material is of at least 50 MPa.

For example, the lateral panels 44, 46 are made of a dual-phase steel, having a yield strength to tensile strength ratio for example inferior to 0.6, preferably inferior to 0.5.

Preferably, the dual-phase steel has a tensile strength greater than or equal to 590 MPa.

The third material is for example the same as the second material.

The steel forming the lateral panels 44, 46 may be uncoated or coated, for example galvannealed or electrogalvanized.

The use of a dual-phase steel for the lateral panels provides a good energy absorption ability, a good fatigue strength, and a good formability.

The lateral panels 44, 46 have a thickness preferably comprised greater than the main panel 40, for example 1 mm.

The main panel 40 and the lateral panels 44, 46 are attached to each other by welding, along welding lines 70, 72 joining the rear end 44b of the front lateral panel 44 to the front end 40a of the main panel 40 on the one side, and the front end 46a of the rear lateral panel 46 to the rear end 40b of the main panel 40 on the other side.

Preferably, the main panel 40 and the lateral panels 44, 46 are welded together before being stamped.

Thus, the materials used for the main panel 40 and the lateral panels 44, 46, as well as the thickness of these panels 40, 44 and 46, can be chosen so as to be adapted to the functions of these panels, in particular to the stresses may be subjected to, and to the the formability required to shape the parts. A method for producing the bed side inner panel 30 will now be described.

The production of the bed side inner panel 30 comprises producing the main panel 40 and the wheel casing 42 separately, and attaching the main panel 40 to the wheel casing 42 by welding.

The main panel 40 is produced by forming a main panel blank of the first material, and stamping the blank to shape the main panel 40.

The main panel blank is substantially planar. The main panel blank is obtained by cutting a sheet of the first material to the appropriate shape, i.e. a shape adapted so that the main panel blank may be stamped to form the main panel 40

The main panel blank is then stamped, for example cold-stamped, to shape the three dimensional main panel 40.

Preferably, before stamping the main panel blank, a lateral edge blank is attached to each lateral side of the main panel blank by laser welding, so as to obtain a side panel blank.

The lateral edge blanks are substantially planar. The lateral edge blanks are destined to form, once stamped, the lateral panels 44, 46. The lateral edge blanks are for example both made of the third material, different from the first material. The lateral edge blanks are obtained by cutting sheets of the third material to the appropriate shapes, i.e. shapes adapted so that the each lateral edge blank may be stamped to form a lateral panel 44, 46.

The side panel blank thus forms a laser welded blank.

The side panel blank is then stamped in a single operation, so as to shape together the three-dimensional main panel 40 and the three-dimensional lateral edges 44, 46.

The wheel casing 42 is produced by forming a wheel casing blank of the second material, and by stamping the wheel casing blank to shape the wheel casing 42.

The wheel casing blank is obtained by cutting a sheet of the second material to the appropriate shape, i.e. a shape adapted so that the wheel casing blank may be stamped to form the wheel casing 42.

The wheel casing blank is substantially planar.

The wheel casing blank is then stamped to shape the three-dimensional wheel casing 42.

Finally, the wheel casing 42 is attached to the main panel 40 by welding.

Preferably, the wheel casing 42 is attached to the main panel 40 by laser welding.

In particular, the main panel 40 is attached to the wheel casing 42 by welding the three-dimensional edge 56 of the main panel 40 to the three-dimensional edge 60 of the wheel casing, along a continuous welding line.

For example, the welding is carried out by butt welding, using a filler material, with a laser power comprised between 3 and 5 kW, and a welding speed comprised between 3 and 5 m/min.

According to a second example, the welding is carried out by lap welding, with a laser power comprised between 3 and 5 kW, and a welding speed comprised between 7 and 10 m/min.

These welding techniques provide a resistant welding of the main panel 40 and the wheel casing 42.

Indeed, these welding techniques are particularly adapted for joining three-dimensional edges, and for welding edges which may not be exactly of complementary shapes, owing to the springback phenomenon which the main panel 40 and the wheel casing 42 may be subjected to following the stamping of these parts.

To limit the effects of this phenomenon on the welding, the deformation rate, i.e. the deformation quantity, of the main panel 40 is preferably equal to the deformation rate, i.e. the deformation quantity, of the wheel casing 42 on either side of the welding line attaching the main panel and the wheel casing.

Forming the main panel 40 and the wheel casing 42 of the structural part as two distinct parts made of different materials allows choosing for each of the main panel and the wheel casing a material and a thickness offering an optimal performance, in function of the stress which they may be submitted to, so that both the resistance of the structural part and its weight may be optimized.

In particular, the wheel casing 42 can thus be made of a material having a high mechanical resistance, i.e. high tensile and yield strengths, without necessitating forming the whole bed side inner panel with this material.

The use of two different materials for forming the main panel 40 and the wheel casing 42 further allows choosing for each of these parts a material which is suitable for shaping these parts by stamping blanks, without obtaining necking or thickening of the steel.

Assembling the main blank by welding before stamping allows the use of a single press for shaping both the main panel 40 and the lateral edges 44, 46, which reduces the production cost.

Furthermore, the use of laser welding provides a continuous weld line between the blanks or parts, and consequently provides a good resistance, and thus a good crash resistance.

It must be understood that the example embodiments presented above are not limiting.

For example, according to another embodiment, the main panel 40 and the lateral panels 44, 46 are made of the same material. The main panel 40 and the lateral panels 44, 46 may also be made of a single part, i.e. be formed by stamping a blank which is obtained by cutting a single steel sheet.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An automotive vehicle structural part comprising:
a main panel; and
a wheel casing,
the main panel including a lower portion and an upper portion, the upper portion protruding perpendicularly from the lower portion, the main panel comprising an opening defining a three-dimensional curved edge,
the wheel casing forming a protrusion extending upwardly from the main panel, the wheel casing comprising a three-dimensional curved edge having a shape complementary to a shape of the three-dimensional curved edge of the main panel, and
the main panel and the wheel casing being made of two distinct three-dimensional parts produced from different materials and attached to each other by welding.

2. The automotive vehicle structural part as recited in claim 1, wherein a wheel casing material of the wheel casing has a higher mechanical resistance than a main panel material of the main panel.

3. The automotive vehicle structural part as recited in claim 1, wherein the main panel and the wheel casing are welded along a welding line, and the main panel has a deformation rate equal to a wheel casing deformation rate of the wheel casing on either side of the welding line.

4. The automotive vehicle structural part as recited in claim 1 further comprising at least one lateral panel, extending at one end of the main panel, the lateral panel and the main panel being made of distinct parts made of different materials attached to each other by welding before the lateral panel and the main panel are stamped.

5. The automotive vehicle structural part as recited in claim 4, wherein a lateral panel material of the lateral panel is the same as a wheel casing material of the wheel casing.

6. The automotive vehicle structural part as recited in claim 4, wherein the at least one lateral panel includes two lateral panels, distinct from the main panel, the two lateral panels extending on either side of the main panel and being attached to the main panel by welding before stamping.

7. The automotive vehicle structural part as recited in claim 4, wherein the at least one lateral panel is made of dual-phase steel.

8. The automotive vehicle structural part as recited in claim 1, wherein the main panel is made of high strength low alloy steel.

9. The automotive vehicle structural part as recited in claim 1, wherein the wheel casing is made of dual-phase steel.

10. The automotive vehicle structural part as recited in claim 1, wherein the structural part forms a bed side inner panel of a cargo box of a pick-up automotive vehicle.

11. A cargo box of a pick-up automotive vehicle comprising:

at least a bed side inner panel, the bed side inner panel being an automotive vehicle structural part as recited in claim 10.

12. A method for producing an automotive vehicle structural part as recited in claim 1, comprising the following steps:
stamping a blank of a first material for shaping the main panel;
stamping a blank of a second material, different from the first material, for shaping the wheel casing; and
attaching the main panel to the wheel casing by welding.

13. The method as recited in claim 12, wherein the main panel is attached to the wheel casing by laser welding.

14. The method as recited in claim 13, wherein the laser welding is carried out by butt welding using a filler material, or by lap welding.

15. The method as recited in claim 12 further comprising the following steps prior to the stamping of the blank of the first material:
attaching a blank of a third material to one of the lateral sides of the blank of the first material by laser welding to obtain a side panel blank;
stamping the side panel blank in a single operation to shape together the main panel and a lateral panel extending at one end of the main panel.

16. The method as recited in claim 15, wherein the third material is the same as the second material.

17. The automotive vehicle structural part as recited in claim 1, wherein the main panel is an integral panel.

* * * * *